United States Patent
Takeuchi (10) Patent No.: US 6,964,253 B2
(45) Date of Patent: Nov. 15, 2005

(54) BALANCER APPARATUS OF ENGINE (75) Inventor: Yoshihiko Takeuchi, Shizuoka (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/991,205

(22) Filed: Nov. 17, 2004

(65) Prior Publication Data
US 2005/0109305 A1 May 26, 2005

(30) Foreign Application Priority Data
Nov. 21, 2003 (JP) .................................. 2003-392631

(51) Int. Cl.[7] .............................................. F02B 75/06
(52) U.S. Cl. .................................................. 123/192.2
(58) Field of Search ..................................... 123/192.2

(56) References Cited

FOREIGN PATENT DOCUMENTS

| JP | 50-32641 | 9/1975 | | |
|---|---|---|---|---|
| JP | 4-30339 | 3/1992 | | |
| JP | 2003184566 A | * | 7/2003 | ........... F02B/77/00 |

* cited by examiner

Primary Examiner—Noah P. Kamen
(74) Attorney, Agent, or Firm—Hogan & Hartson, LLP (57) ABSTRACT A balancer apparatus of an engine includes a crank case, a crankshaft supported by the crank case and including a crank web having a pin connecting portion connected with a crank pin and a counter weight portion, a balancer shaft arranged in parallel with the crankshaft and rotated in cooperation with the crankshaft and a balance weight provided on the balancer shaft and rotated integrally with the balancer shaft. The balancer shaft is installed at a position of overlapping the crank web when viewed from an axial direction of the crankshaft.

20 Claims, 6 Drawing Sheets

BALANCER APPARATUS OF ENGINE

BACKGROUND OF THE INVENTION

1. Field of the Invention

The present invention relates to a balancer apparatus of an engine having a balance weight rotated in cooperation with a crankshaft for canceling an inertia force accompanied by reciprocal movement of a piston.

2. Description of Related Art

There is known an engine for a motorcycle, for example, containing a balancer apparatus for canceling an inertia force of a reciprocal movement portion of a piston, a connecting rod or the like inside of a crank case.

A balancer apparatus of this kind includes a balance weight rotated at a speed the same as that of the crankshaft and in a direction inverse thereto. There is a mode of the balance weight installed on the crankshaft coaxially therewith and another mode thereof installed on a shaft separate from the crankshaft, and in either of the cases, the balance weight is driven by transmitting power from the crankshaft.

A conventional balancer apparatus includes a pair of balance weights and the balance weights are respectively supported rotatably on journal portions disposed at both ends of the crankshaft. The balance weights need to rotate in a direction inverse to that of the crankshaft and therefore, a middle shaft is arranged in parallel with the crankshaft. The middle shaft includes a pair of sprockets rotating at a speed the same as that of the crankshaft and in a direction inverse thereto at both ends thereof and chains are hung between the sprockets and the balance weights.

Therefore, an output outputted to the crankshaft is temporarily transmitted to the sprockets on the intermediate shaft and thereafter transmitted to the balance weights via the chains.

When the balance weights are coaxially installed on the crankshaft, there is needed the exclusive middle shaft for driving the balance weights in the direction inverse to that of the crankshaft. Therefore, there is a drawback that the number of shafts is increased and the crank case supporting shafts becomes large-sized.

Further, since the balance weights are disposed at the journal portions at both ends of the crankshaft, when, for example, an output is outputted from a shaft end of the crankshaft by utilizing a gear, the gear cannot be disposed proximate to a center portion of the crankshaft along an axial direction due to a hindrance by the balance weights or the chains.

As a result, the gear for outputting the output is considerably extended to an outer side in the axial direction of the crankshaft to cause to bring about a large-size formation of the crank case. Along therewith, in outputting the output from the shaft end of the crankshaft, there poses a problem that a path of outputting the output becomes complicated, or the output is difficult to be outputted.

On the other hand, according to another conventional balancer apparatus, a balance weight is disposed on a main shaft of a transmission or a balancer shaft. The main shaft or the balancer shaft is disposed in parallel with the crankshaft and disposed on an outer side of a rotational locus drawn by an outer peripheral face of a crank web to avoid interference of the crankshaft with the crank web.

However, according to the constitution, spaces for bringing in the crank web need to be ensured between the crankshaft and the main shaft as well as between the crankshaft and the balancer shaft, and it is unavoidable that a distance between the shafts is increased. As a result, the crank case becomes large-sized and the balance weight cannot compactly be integrated to the crank case.

It is an advantage of the invention to provide a balancer apparatus of an engine capable of compactly integrating a balance weight to a crank case and capable of preventing a large-size formation of the crank case.

SUMMARY OF THE INVENTION

In order to achieve the above-described advantage, according to an embodiment of the invention, there is provided a balancer apparatus of an engine including a crank case, a crankshaft supported by the crank case and including a crank web having a pin connecting portion connected with a crank pin and a counter weight portion, a balancer shaft arranged in parallel with the crankshaft and rotated in cooperation with the crankshaft, and a balance weight provided on the balancer shaft and rotated integrally with the balancer shaft. The balancer shaft is installed at a position of overlapping the crank web when viewed from an axial direction of the crankshaft.

According to the invention, a distance between axes which is the distance between the crank shaft and the balancer shaft can be shortened. Therefore, the balancer shaft and the balance weight can compactly be integrated to the crank case and a large-size formation of the crank case can be prevented.

DETAILED DESCRIPTION OF THE INVENTION

An explanation will be given of an embodiment of the invention in reference to FIG. 1 through FIG. 6 as follows.

Figure 1:
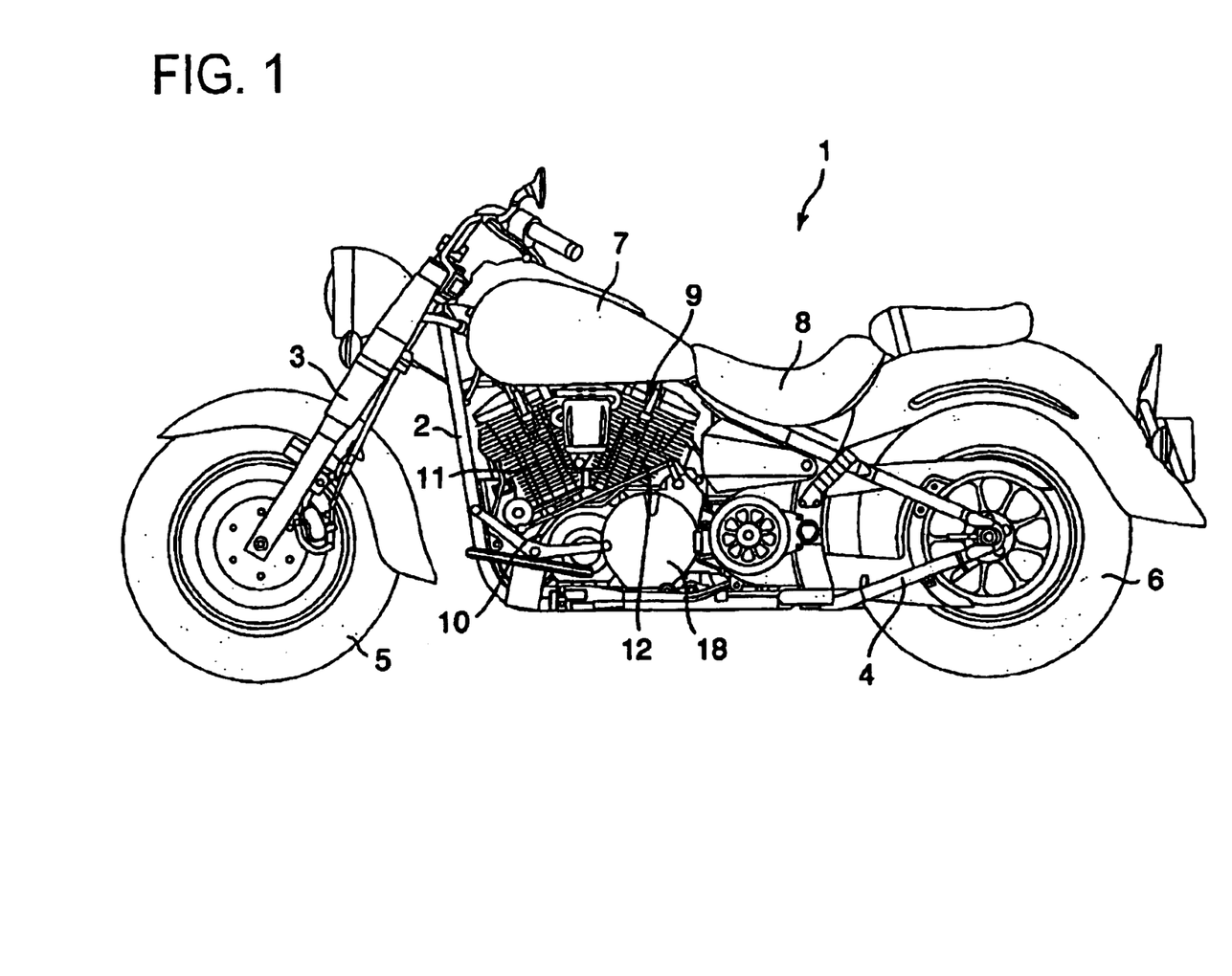
FIG. 1 is a side view of a motorcycle mounted with an air-cooled 4-cycle V type 2-cylinder engine.

FIG. 1 discloses a motorcycle 1 to which the invention is applied. The motorcycle 1 includes a frame 2 of a cradle type, and the frame 2 is attached with a front fork 3 and a rear swing arm 4. The front fork 3 supports a front wheel 5, and the rear swing arm 4 supports a rear wheel 6.

The frame 2 supports a fuel tank 7, a seat 8 and an air-cooled 4-cycle type 2-cylinder engine 9. The engine 9 is disposed between the front wheel 5 and the rear wheel 6 and on the lower side of the fuel tank 7.

Figure 3:
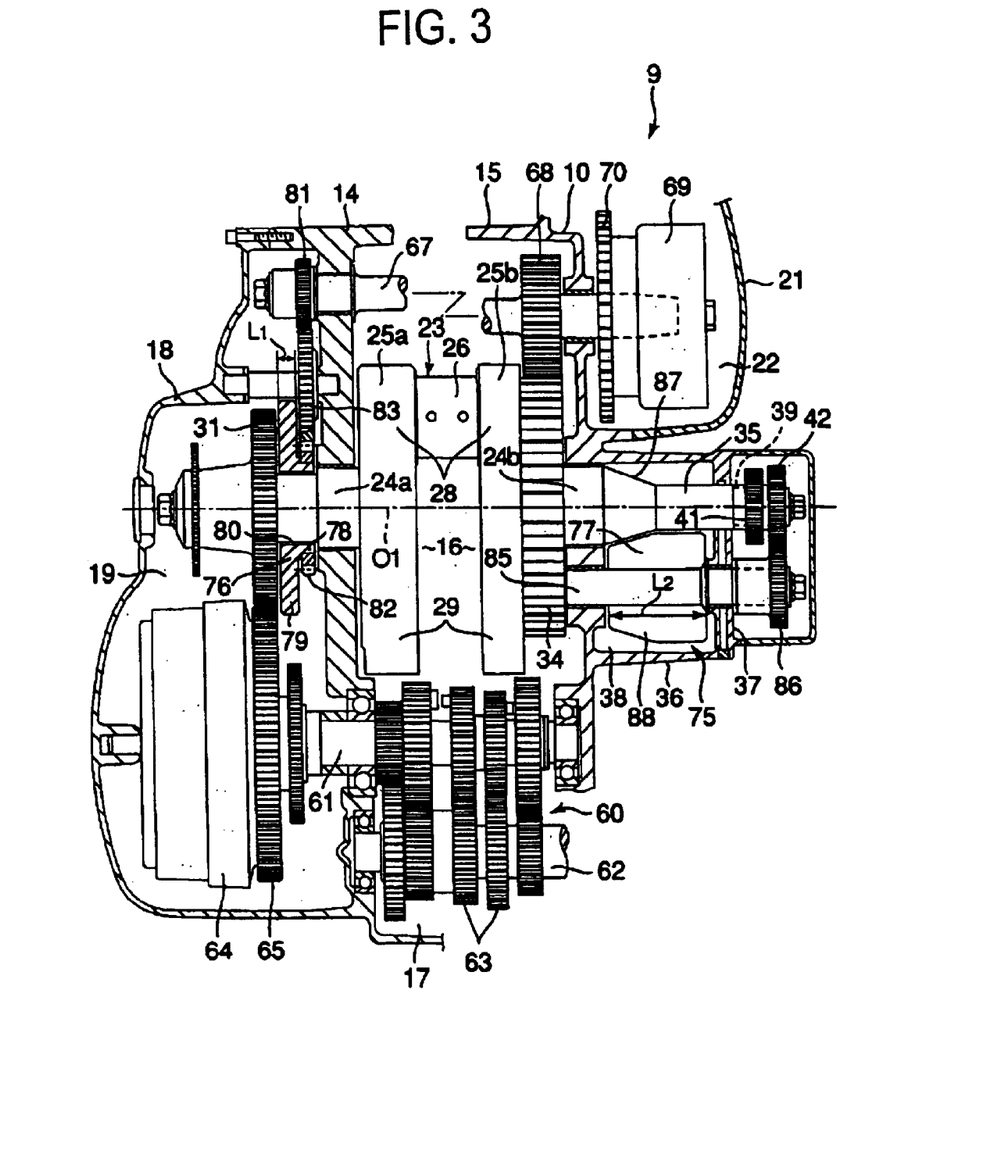
FIG. 3 is a sectional view of the air-cooled 4-cycle V type 2-cylinder engine showing a positional relationship among the crankshaft, a gear speed changing apparatus, a relay shaft and the balancer shaft.

The engine 9 is provided with a crank case 10, a front cylinder 11 and a rear cylinder 12. As shown by FIG. 3, the crank case 10 is divided into a left case 14 and a right case 15, and a crank chamber 16 and a transmission chamber 17 are formed between the left case 14 and the right case 15. The transmission chamber 17 is disposed on a rear side of the crank chamber 16.

A clutch cover 18 is attached to an outer side face of the left case 14. The clutch cover 18 forms a clutch chamber 19 between the clutch cover 18 and the left case 14. The clutch chamber 19 is contiguous to the crank chamber 16 by interposing the left case 14 therebetween.

A generator cover 21 is attached to an outer side face of the right case 15. The generator cover 21 is formed with a generator chamber 22 between the generator cover 21 and the right case 15. The generator chamber 22 is disposed at a front end portion of the crank case 10 and is contiguous to the crank chamber 16 by interposing the right case 15 therebetween.

The crank chamber 16 contains a single piece of a crankshaft 23. The crankshaft 23 is arranged horizontally along a vehicle width direction of the motorcycle 1. The crankshaft 23 is provided with a pair of journal portions 24a, 24b, a pair of crank webs 25a, 25b and a crank pin 26. The journal portions 24a, 24b are disposed at both ends of the crankshaft 23 and disposed on an axis line 01 passing a rotation center of the crankshaft 23.

The crank webs 25a, 25b respectively include pin connecting portions 28 and counter weight portions 29. The pin connecting portions 28 are eccentric to the journal portions 24a, 24b and the crank pin 26 is connected to the pin connecting portions 28. The counter weight portions 29 are for ensuring masses of the crank webs 25a, 25b and are extended to a side opposed to the crank pin 26 by interposing the axis line 01 of the crankshaft 23. A portion of an outer peripheral face of the counter weight portion 29 constitutes a curved face 29a bent in a shape of a circular arc.

The journal portion 24a on one side of the crankshaft 23 is rotatably supported by the left case 14. A front end portion of the journal portion 24a is introduced into the clutch chamber 19. The front end portion of the journal portion 24a is fixed with a first speed reducing gear 31. The first speed reducing gear 31 constitutes an output transmitting member for outputting the output of the crankshaft 23 and is disposed in the clutch chamber 19.

The journal portion 24b on other side of the crankshaft 23 is rotatably supported by the right case 15. A drive gear 34 is fixed onto the journal portion 24b. The drive gear 34 is interposed between the crank web 25b and the right case 15 and is disposed in the crank chamber 16. Further, the journal portion 24b on the other side includes a front end portion 35 projected in a direction of an outer side of the right case 15.

An outer wall 36 in a cylindrical shape is formed at an outer side face of the right case 15. The outer wall 36 surrounds the front end portion 35 of the journal portion 24b and a projected end of the outer wall 36 is closed by a case cover 37. The case cover 37 constitutes a cam chamber 38 in cooperation with the outer wall 36. The front end portion 35 of the journal portion 24b is disposed in the cam chamber 38.

The front end portion 35 of the journal portion 24b includes an extended portion 39 extended in an axial direction. The extended portion 39 is projected outside of the cam chamber 38 by penetrating through the case cover 37, and a cam drive gear 41 and a balancer drive gear 42 are coaxially fixed onto the extended portion 39.

Figure 2:
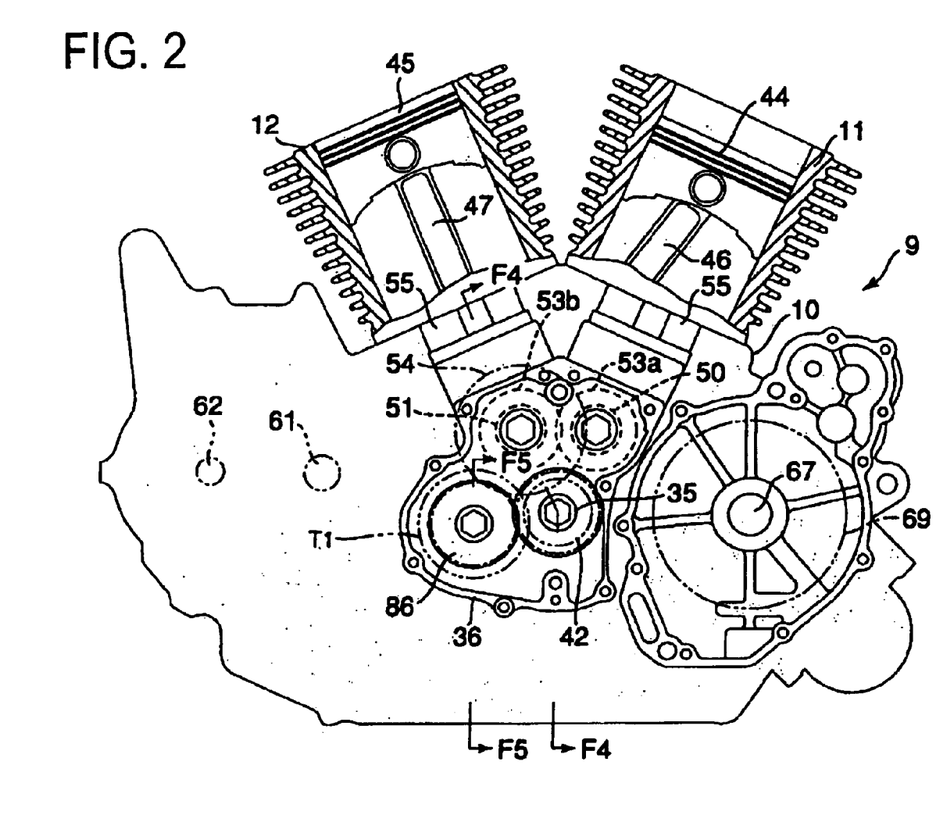
FIG. 2 is a side view of the air-cooled 4-cycle V type 2-cylinder engine showing a positional relationship among a crankshaft, a camshaft and a balancer shaft.
Figure 6:
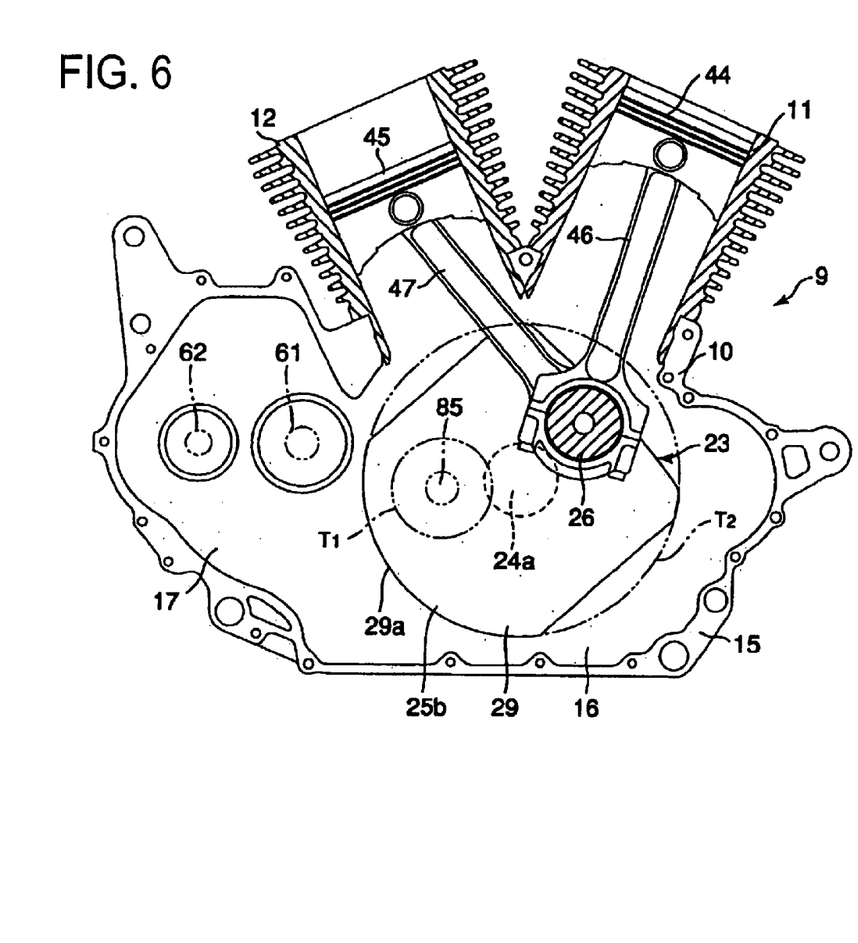
FIG. 6 is a side view of the air-cooled 4-cycle V type 2-cylinder engine showing a positional relationship between a crank web of the crankshaft and a second balance weight.

As shown by FIG. 2 and FIG. 6, the front cylinder 11 and the rear cylinder 12 of the engine 9 respectively contain single pistons 44, 45. The pistons 44, 45 are connected to the crank pin 26 of the crankshaft 23 via connecting rods 46, 47. In the case of the embodiment, the pistons 44, 45 of the front and the rear cylinders 11, 12 are reciprocated by substantially the same timing and the crankshaft 23 is driven to rotate by reciprocating of the pistons 44, 45.

Figure 4:
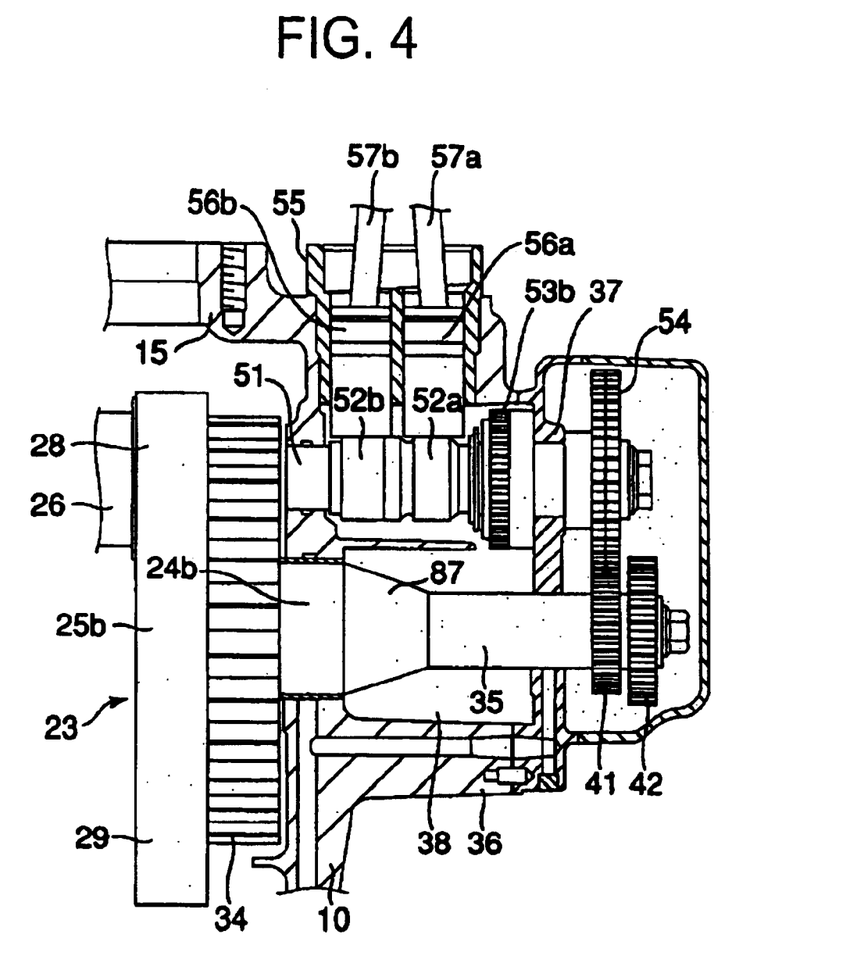
FIG. 4 is a sectional view taken along a line F4—F4 of FIG. 2.

As shown by FIG. 2 and FIG. 4, the cam chamber 38 of the right case 15 contains two pieces of camshafts 50, 51. The camshafts 50, 51 are disposed on an upper side of the journal portion 24b of the crankshaft 23. The camshafts 50, 51 are arranged in parallel with the crankshaft 23 and are aligned in a front and rear direction of the engine 9. The camshaft 51 on the rear side includes two valve moving cams 52a, 52b for opening and closing an intake valve and an exhaust valve of the rear cylinder 12. Similarly, the camshaft 50 on the front side includes two valve moving cams (not illustrated) for opening and closing an intake valve and an exhaust valve of the front cylinder 11. The valve moving cams 52a, 52b are aligned in an axial direction of the camshaft 50.

The camshafts 50, 51 respectively include middle gears 53a, 53b. The middle gears 53a, 53b are brought in mesh with each other inside of the cam chamber 38. By bringing the middle gears 53a, 53b in mesh with each other, two pieces of the camshafts 50, 51 are rotated to synchronize with each other. The camshaft 51 on the rear side is projected outside of the cam chamber 38 by penetrating the case cover 37. A projected end of the camshaft 51 is fixed with a timing gear 54. The timing gear 54 is brought in mesh with the cam drive gear 41 rotated integrally with the crankshaft 23. Therefore, two pieces of the camshafts 50, 51 are driven to rotate by transmitting power from the crankshaft 23.

An upper portion of the cam chamber 38 is attached with a pair of lifter holders 55. The lifter holders 55 respectively support a pair of valve lifters 56a, 56b to be able to move in an up and down direction. The valve lifters 56a, 56b are interposed between push rods 57a, 57b moved in cooperation with the intake and the exhaust valves and the valve moving cams 52a, 52b of the camshafts 50, 51.

As shown by FIG. 3, a gear speed changing apparatus 60 is contained in the transmission chamber 17 of the crank case 10. The gear speed changing apparatus 60 includes a first and a second speed changing shaft 61, 62, and a plurality of speed changing gear trains 63 mounted on the speed changing shafts 61, 62. The first and the second speed changing shafts 61, 62 span the left case 14 and the right case 15 and are arranged in parallel with the crankshaft 23.

One end of the first speed changing shaft 61 is introduced into the clutch chamber 19 by penetrating the left case 14. The one end of the first speed changing shaft 61 is attached with a clutch 64 as a driven member. The clutch 64 is for transmitting and cutting the output of the crankshaft 23 to and from the gear speed changing apparatus 60 and is disposed at an input end of the gear speed changing apparatus 60. The clutch 64 includes a second speed reducing gear 65. The second speed reducing gear 65 is brought in mesh with the first speed reducing gear 31 and the output of the crankshaft 23 is transmitted to the clutch 64 by bringing the second speed reducing gear 65 in mesh with the first speed reducing gear 31.

A front end portion of the crank chamber 16 is arranged with a relay shaft 67. The relay gear 67 spans the left case 14 and the right case 15 and is arranged in parallel with the crankshaft 23. The relay shaft 67 includes a driven gear 68. The driven gear 68 is brought in mesh with the drive gear 34 rotated integrally with the crankshaft 23. By bringing the driven gear 68 in mesh with the drive gear 34, the relay gear 67 is rotated by a rotational speed twice as much as that of the crankshaft 23 and in a direction reverse thereto.

One end of the relay gear 67 is introduced into the generator chamber 22 by penetrating through the right case 15 and the one end of the relay gear 67 is fixed with a generator 69. The generator 69 includes a starting gear 70 driven by a starter motor, not illustrated.

As shown by FIG. 3, the V-type 2-cylinder engine 9 is mounted with a balancer 75 for reducing the vibration of the engine. The balancer 75 is for canceling a primary component of an inertia force of reciprocating portions of the pistons 44, 45 and the connecting rods 46, 47 and is provided with a first balance weight 76 and a second balance weight 77.

The first balance weight 76 is coaxially supported by a front end portion of the journal portion 24a of the crankshaft 23. The first balance weight 76 is contained in the clutch chamber 19 and is interposed between the first speed reducing gear 31 and the left case 14.

The first balance weight 76 is provided with a boss portion 78 and a weight portion 79. The boss portion 78 is rotatably supported by the front end portion of the journal portion 24a via a bush 80. The weight portion 79 is constituted by a shape of a circular disk extended from an outer peripheral face of the boss portion 78 to an outer side in a diameter direction and a dimension of the outer diameter is made to be slightly larger than that of the first speed reducing gear 31.

The first balance weight 76 is driven by a speed the same as that of the crankshaft 23 and in a direction inverse thereto by transmitting power from the relay shaft 67. An explanation will be given of a path of driving the first balance weight 76. As shown by FIG. 3, the other end of the relay shaft 67 is introduced into a front end portion of the clutch chamber 19 by penetrating the left case 14, and the other end of the relay shaft 67 is fixed with a drive gear 81. Further, a driven gear 82 is fixed to an outer peripheral face of the boss portion 78 of the first balance weight 76. The driven gear 82 is disposed on a side opposed to the first speed reducing gear 31 by interposing the weight portion 79 and is shifted from the first speed reducing gear 31 in a direction of a center portion of the crankshaft 23 along the axial direction.

The drive gear 81 and the driven gear 82 are brought in mesh with a common idle dear gear 83. By bringing the drive gear 81 and the driven gear 82 in mesh with the idle dear gear 83, a rotational speed of the relay shaft 67 is halved to transmit to the first balance weight 76 and the first balance weight 76 is rotated in a direction the same as that of the relay shaft 67

On the other hand, the second balance weight 77 is provided on a balancer shaft 85 separate from the crankshaft 23. The balancer shaft 85 is disposed on a side opposed to the clutch 64 and the first balance weight 76 by interposing the crank case 10 and is contained in the cam chamber 38 of the right case 15 according to the embodiment.

Figure 5:
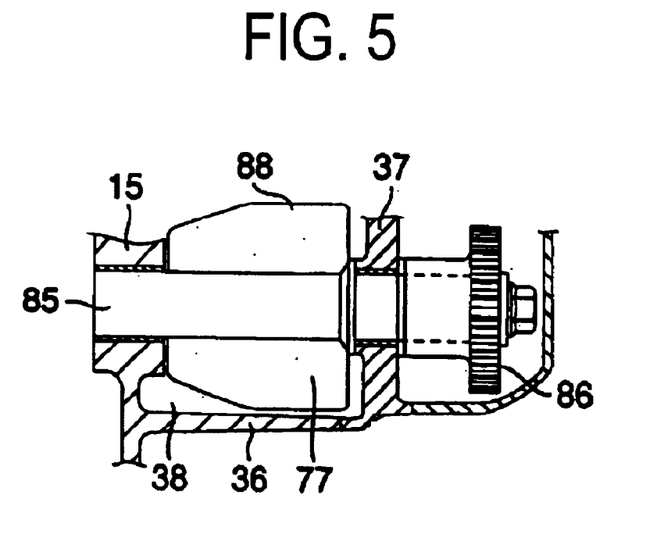
FIG. 5 is a sectional view taken along a line F5—F5 of FIG. 2.

Describing specifically, as shown by FIG. 2 and FIG. 5, the balancer shaft 85 spans the right case 15 and the case cover 37. The balancer shaft 85 is in parallel with the journal portion 24b of the crankshaft 23 and is disposed on a rear side of the journal portion 24b.

A front end portion of the balancer shaft 85 is projected outside of the cam chamber 38 by penetrating the case cover 37, and the front end portion of the balancer shaft 85 is fixed with a driven gear 86. The driven gear 86 is brought in mesh with the balancer drive gear 42 rotated integrally with the crankshaft 23. By bringing the driven gear 86 in mesh with the balancer drive gear 42, the balancer shaft 85 is rotated by a speed the same as that of the crankshaft 23 and in a direction inverse thereto.

The second balance weight 77 is extended from an outer peripheral face of the balancer shaft 85 to an outer side in a diameter direction and is extended in an axial direction of the balancer shaft 85. The second balance weight 77 is rotated integrally with the balancer shaft 85 inside of the cam chamber 38.

As shown by FIG. 3 and FIG. 6, when the cam chamber 38 is viewed from the axial direction of the crankshaft 23, the balancer shaft 85 inside the cam chamber 38 is installed at a position overlapping the crank web 25b. Along therewith, according to the embodiment, the total of the second balance weight 77 is so installed at a position overlapping the crank web 25b. Owing thereto, a rotational locus T1 drawn by an outer peripheral edge of the second balance weight 77 is brought into an inner side of a rotational locus T2 drawn by outer peripheral faces of maximum diameter portions of the crank webs 25a, 25b.

The front end portion 35 of the journal portion 24b is opposed to the second balance weight 77 inside of the cam chamber 38. The front end portion 35 includes a small diameter portion 87 a diameter of which is contracted as proceeding in a direction of the extended portion 39 disposed at a shaft end thereof. As a result, although a distance between axes which is the distance between the journal portion 24b and the balancer shaft 85 stays to be constant, an interval between an outer peripheral face of the small diameter portion 87 and an outer peripheral face of the balancer shaft 85 is widened. In other words, the second balance weight 77 includes an expanded portion 88 expanded to be brought into the small diameter portion 87 and a mass of the second balance weight 77 is increased by an amount of the expanded portion 88.

Further, when a dimension of the first balance weight 76 along the axial direction of the journal portion 24a is designated by notation L1 and a dimension of the second balance weight 77 along the axial direction of the balancer shaft 85 is designated by notation L2, the first and second balance weights 76, 77 are determined by a relationship of L1<L2.

Therefore, the first balance weight 76 coaxial with the crankshaft 23 ensures the mass by enlarging the diameter and the second balance weight 77 which is not coaxial with the crankshaft 23 ensures the mass by enlarging the dimension L2 in the axial direction of the balancer shaft 85.

According to such a constitution, when the crankshaft 23 is rotated by reciprocating the pistons 44, 45, the first balance weight 76 and the second balance weight 77 are rotated by a speed the same as that of the crankshaft 23 and in directions reverse thereto. By rotating the first balance weight 76 and the second balance weight 77, the primary component of the inertia force accompanied by reciprocating the pistons 44, 45 is canceled by the counter weight portions 29 of the crankshaft 23 and the first and the second balance weights 76, 77, and unpleasant vibration of the engine 9 is reduced.

According to the above-described embodiment, the balancer shaft 85 including the second balance weight 77 is installed at a position overlapping the crank webs 25a, 25b when viewed from the axial direction of the crankshaft 23. Along therewith, also the second balance weight 77 is disposed at a region at which the rotational locus T1 drawn by the outer peripheral edge is surrounded by the rotational locus T2 drawn by the maximum diameter portions of the crank webs 25a, 25b.

Therefore, by making the balancer shaft 85 proximate to the journal portion 24b of the crankshaft 23, a distance between axes can be shortened, and the second balance weight 77 is not considerably expanded to a surrounding of the crankshaft 23. Therefore, the balancer shaft 85 and the second balance weight 77 can compactly be integrated to the crank case 23 which is limited in a space thereof, and a large-size formation of the crank case 10 can be prevented.

Further, the first balance weight 76 is installed coaxially with the crankshaft 23 and therefore, a couple of forces of inertia is not produced at the first balance weight 76 and an unbalanced inertia force is difficult to be produced. As a result, it is not necessary to cancel the couple of forces of inertia of the first balance weight 76 by the second balance weight 77, in other words, it is not necessary to give a consideration to a balance of the couples of forces of inertia of the first and the second balance weights 76, 77.

Therefore, the balancer shaft 85 can be made to be as proximate to the journal portion 24a of the crankshaft 23 as possible, and the balancer shaft 85 and the second balance weight 77 can reasonably be contained inside of the rotational locus T2 of the crank webs 25a, 25b.

In addition thereto, according to the above-described constitution, the balancer shaft 85 having the second balance weight 77 is disposed on the side opposed to the first speed reducing gear 31 and the clutch 64 for outputting the output of the crankshaft 23 by interposing the crank case 10. Therefore, in installing the second balance weight 77, the first speed reducing gear 31 and the clutch 64 do not constitute a hindrance.

In other words, the second balance weight 77 and the balancer shaft 85 supporting the second balance weight 77 do not prevent the output of the crankshaft 23 from being outputted, and the output from the crankshaft 23 can easily be outputted although the balancer shaft 85 is constituted to be separate from the crankshaft 23.

Further, the invention is not specified to the V-type 2-cylinder engine but can similarly be embodied even for, for example, a single cylinder engine having a large vibration.

What is claimed is:

1. A balancer apparatus of an engine, comprising:
a crank case;
a crankshaft supported by the crank case and including a crank web having a pin connecting portion connected with a crank pin and a counter weight portion;
a balancer shaft arranged in parallel with the crankshaft and rotated in cooperation with the crankshaft; and
a balance weight provided on the balancer shaft and rotated integrally with the balancer shaft,
wherein the balancer shaft is installed at a position of overlapping the crank web when viewed from an axial direction of the crankshaft.

2. The balancer apparatus of an engine according to claim 1, wherein the balance weight is extended from an outer peripheral face of the balancer shaft to an outer side in a diameter direction thereof and is disposed on an inner side of a rotational locus drawn by an outer peripheral face of the crank web when viewed from the axial direction of the crankshaft.

3. The balancer apparatus of an engine according to claim 2, wherein the crankshaft includes a journal portion rotatably supported by the crank case and the journal portion includes a small diameter portion having a diameter of which is contracted to bring in the balance weight at a portion thereof opposed to the balance weight.

4. The balancer apparatus of an engine according to claim 2, wherein the crankshaft includes an output transmitting member for outputting an output of the crankshaft at one end thereof along the axial direction, and the balancer shaft is disposed on a side opposed to the output transmitting member by interposing the crank case therebetween.

5. The balancer apparatus of an engine according to claim 1, wherein the crankshaft includes a journal portion rotatably supported by the crank case and the journal portion includes a small diameter portion having a diameter of which is contracted to bring in the balance weight at a portion thereof opposed to the balance weight.

6. The balancer apparatus of an engine according to claim 5, wherein the crank case supports a camshaft including a plurality of valve moving cams, and the camshaft is disposed on an upper side of the journal portion of the crankshaft and is arranged in parallel with the crankshaft and the balancer shaft.

7. The balancer apparatus of an engine according to claim 6, wherein the crankshaft includes an output transmitting member for outputting an output of the crankshaft at one end thereof along the axial direction, and the balancer shaft is disposed on a side opposed to the output transmitting member by interposing the crank case therebetween.

8. The balancer apparatus of an engine according to claim 5, wherein the crankshaft includes an output transmitting member for outputting an output of the crankshaft at one end thereof along the axial direction, and the balancer shaft is disposed on a side opposed to the output transmitting member by interposing the crank case therebetween.

9. The balancer apparatus of an engine according to claim 1, wherein the crankshaft includes an output transmitting member for outputting an output of the crankshaft at one end thereof along the axial direction, and the balancer shaft is disposed on a side opposed to the output transmitting member by interposing the crank case therebetween.

10. The balancer apparatus of an engine according to claim 1, wherein the balancer shaft is rotated by a speed, the same as a speed of the crankshaft and in a direction inverse to a direction thereof.

11. A balancer apparatus of an engine, comprising:
a crank case;
a crankshaft including a crank web having a pin connecting portion connected with a crank pin and a counter weight portion;
a first balance weight supported coaxially by the crankshaft and rotated in cooperation with the crankshaft;
a balancer shaft arranged on a side opposed to the first balance weight by interposing the crank web therebetween, brought in parallel with the crankshaft and rotated in cooperation with the crankshaft; and
a second balance weight provided on the balancer shaft and rotated integrally with the balancer shaft,
wherein the balancer shaft is installed at a position of overlapping the crank web when viewed from an axial direction of the crankshaft.

12. The balancer apparatus of an engine according to claim 11, wherein the first balance weight and the second balance weight are respectively rotated by a speed the same as a speed of the crankshaft and in a direction inverse to a direction thereof.

13. The balancer apparatus of an engine according to claim 12, wherein the crankshaft includes an output transmitting member for outputting an output of the crankshaft at one end thereof along the axial direction, the first balance weight is disposed on a side the same as a side of the output transmitting member relative to the crankshaft, and the balancer shaft is disposed on a side opposed to the output transmitting member by interposing the crank case therebetween.

14. The balancer apparatus of an engine according to claim 12, wherein the second balance weight is extended from an outer peripheral face of the balancer shaft to an outer side in a diameter direction thereof and is disposed on an inner side of a rotational locus drawn by an outer peripheral face of the crank web when viewed from the axial direction of the crankshaft.

15. The balancer apparatus of an engine according to claim 12, wherein when a dimension of the first balance weight along the axial direction of the crankshaft is designated by a notation L1 and when a dimension of the second balance weight along an axial direction of the balancer shaft is designated by a notation L2, the dimension of the first balance weight and the dimension of the second balance weight are rectified by a relationship of L1<L2.

16. The balancer apparatus of an engine according to claim 11, wherein the crankshaft includes an output transmitting member for outputting an output of the crankshaft at one end thereof along the axial direction, the first balance weight is disposed on a side the same as a side of the output transmitting member relative to the crankshaft, and the balancer shaft is disposed on a side opposed to the output transmitting member by interposing the crank case therebetween.

17. The balancer apparatus of an engine according to claim 11, wherein the second balance weight is extended from an outer peripheral face of the balancer shaft to an outer side in a diameter direction thereof and is disposed on an inner side of a rotational locus drawn by an outer peripheral face of the crank web when viewed from the axial direction of the crankshaft.

18. The balancer apparatus of an engine according to claim 11, wherein when a dimension of the first balance weight along the axial direction of the crankshaft is designated by a notation L1 and when a dimension of the second balance weight along an axial direction of the balancer shaft is designated by a notation L2, the dimension of the first balance weight and the dimension of the second balance weight are rectified by a relationship of L1<L2.

19. A balancer apparatus of an engine, comprising:
a crank case;
a crankshaft supported by the crank case and including a crank web having a pin connecting portion connected with a crank pin and a counter weight portion;
an output transmitting member arranged at one end along an axial direction of the crankshaft for outputting an output of the crankshaft;
a driven member arranged at a surrounding of the crankshaft and driven by the output transmitting member;
a balancer shaft arranged on a side opposed to the output transmitting member by interposing the crank case, rotated in cooperation with the crankshaft and installed at a position of overlapping the crank web when viewed from the axial direction of the crankshaft; and
a balance weight provided on the balancer shaft and rotated integrally with the balancer shaft.

20. The balancer apparatus of an engine according to claim 19, wherein the output transmitting member is a first speed reducing gear having a diameter larger than a diameter of the crankshaft, the driven member is a clutch having a second speed reducing gear brought in mesh with the first speed reducing gear, and the clutch is disposed at an input end of a speed changing apparatus integrated to the crank case.

* * * * *